Oct. 21, 1924.

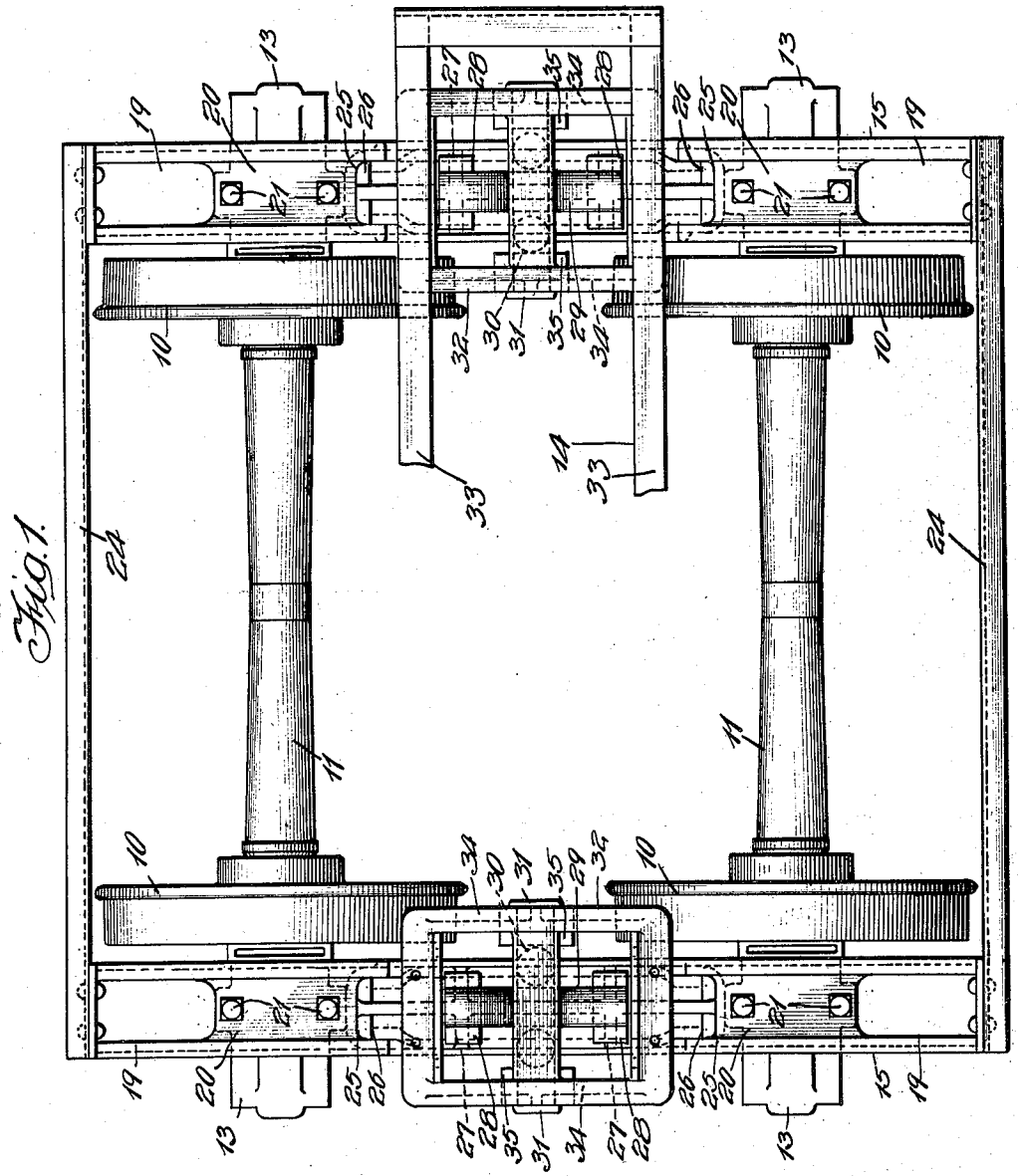

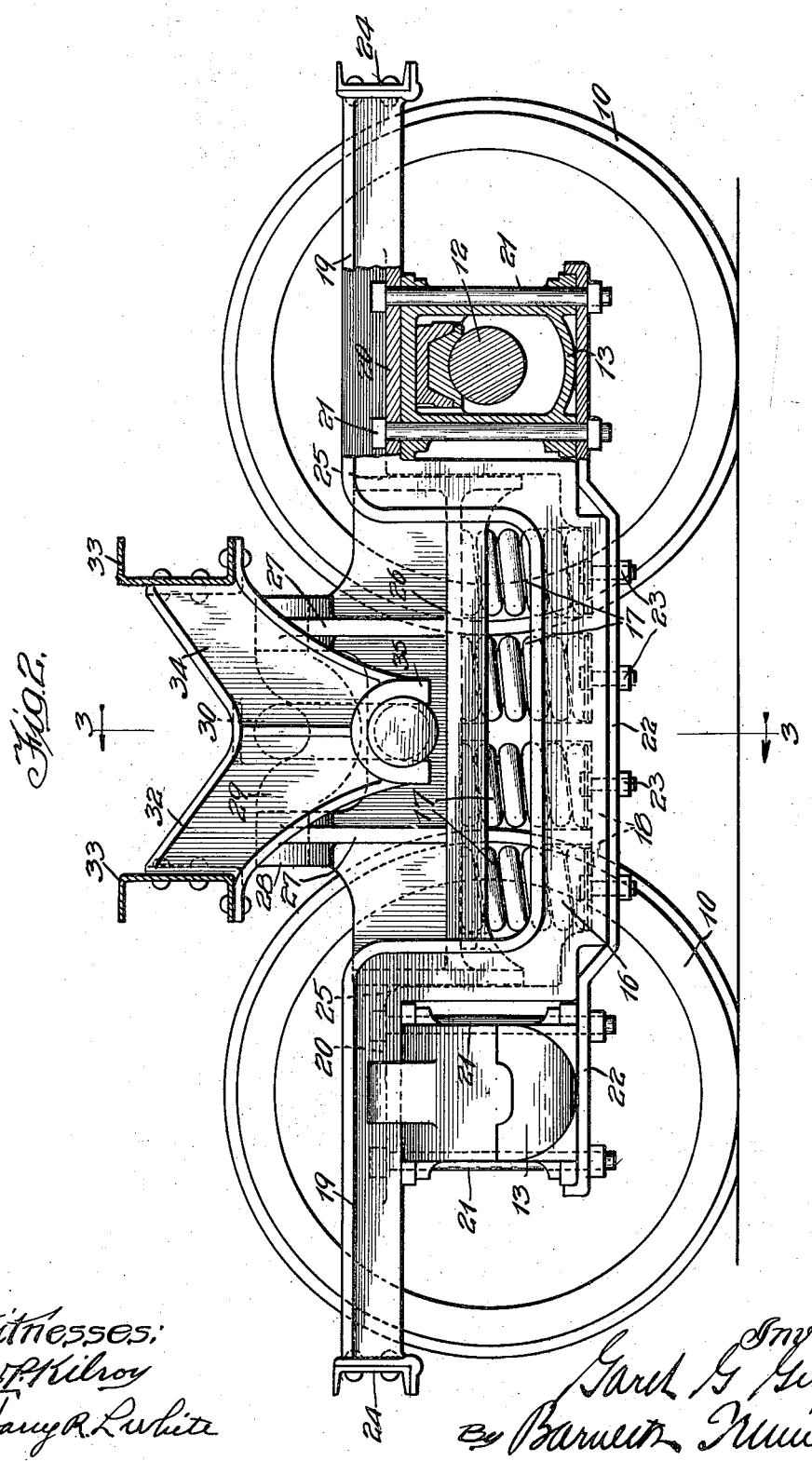

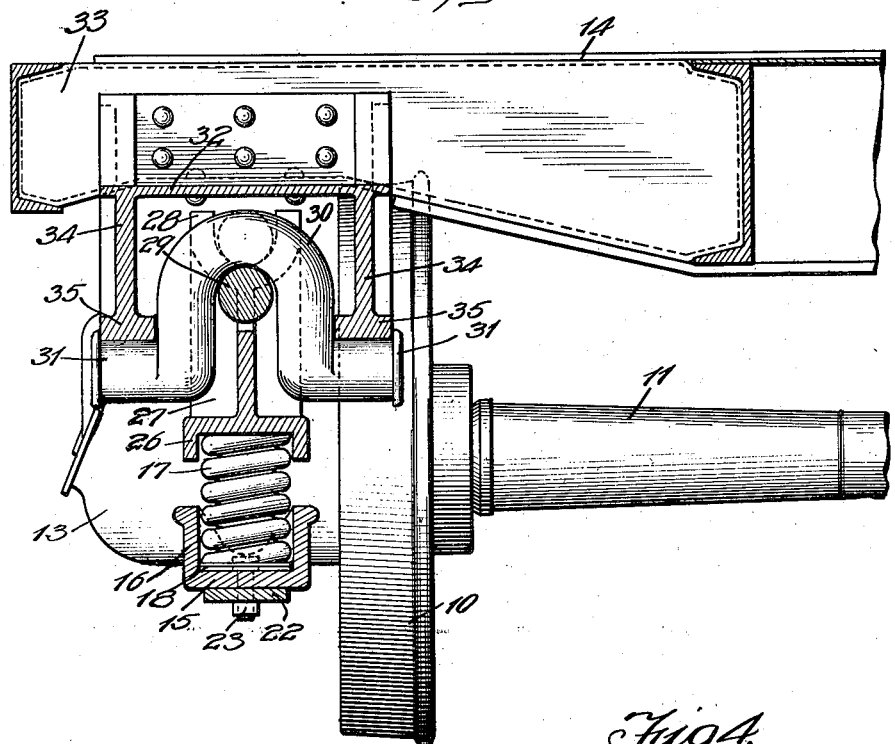
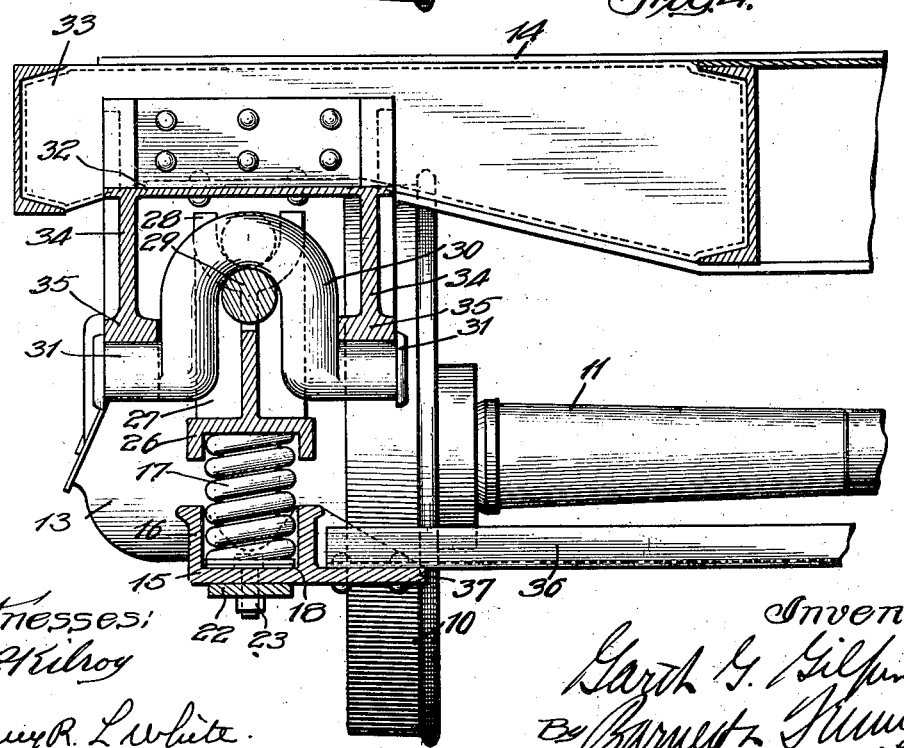

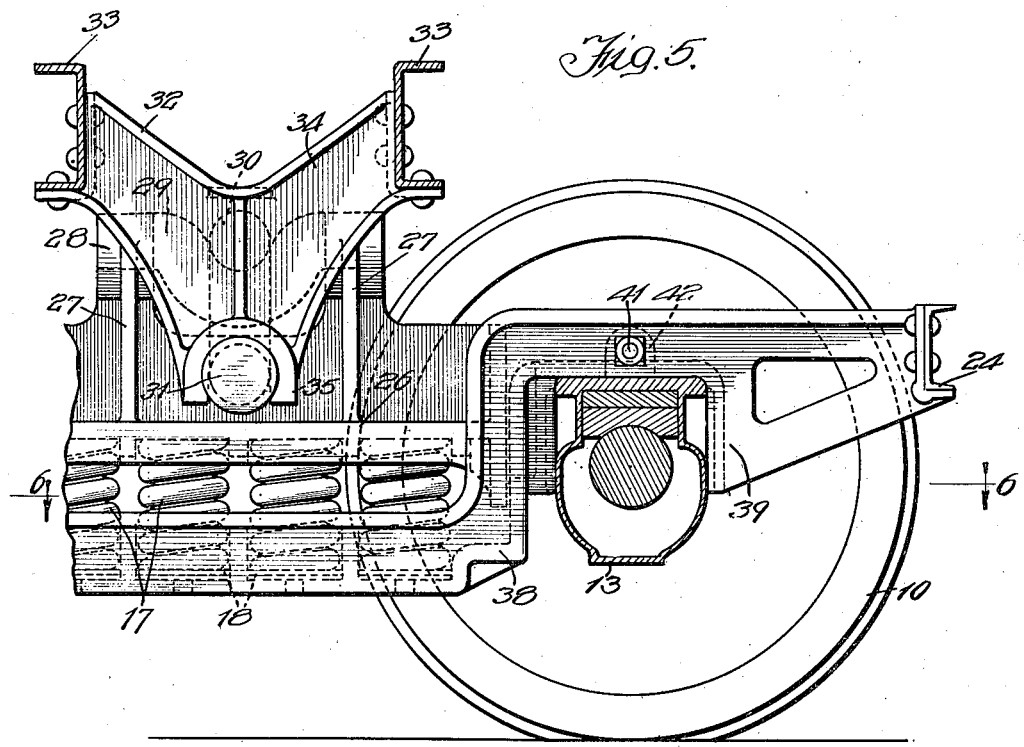

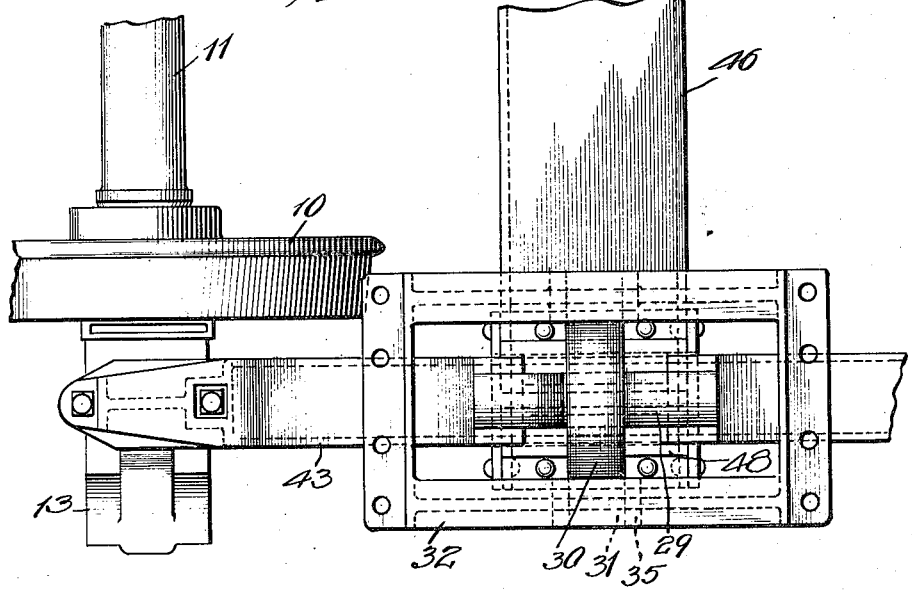
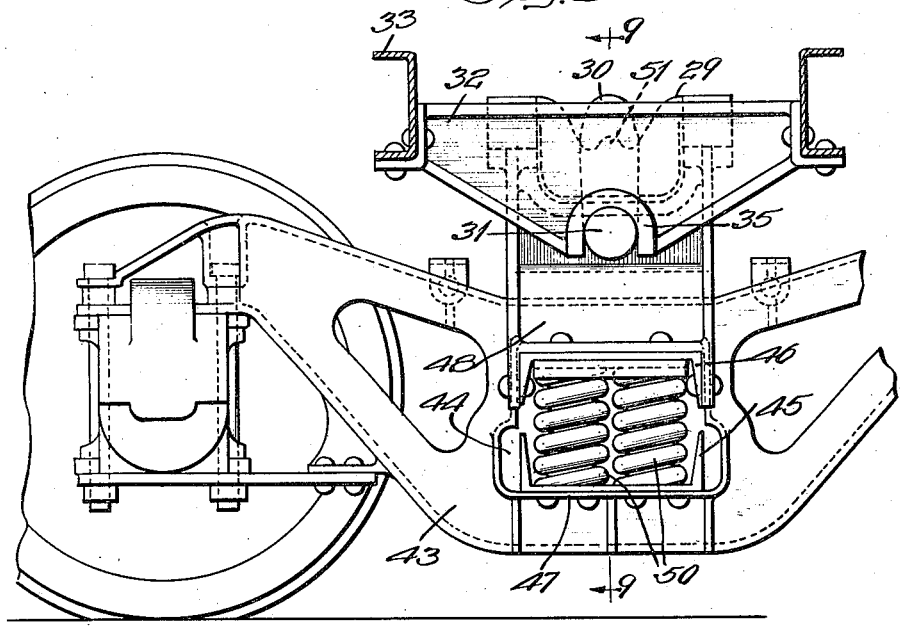

G. G. GILPIN 1,512,217

RAILWAY CAR TRUCK

Filed May 5, 1919

Patented Oct. 21, 1924.

1,512,217

UNITED STATES PATENT OFFICE.

GARTH G. GILPIN, OF RIVERSIDE, ILLINOIS, ASSIGNOR TO WALTER P. MURPHY, OF NEW YORK, N. Y.

RAILWAY-CAR TRUCK.

Application filed May 5, 1919. Serial No. 294,670.

*To all whom it may concern:*

Be it known that I, GARTH G. GILPIN, a citizen of the United States, residing at Riverside, in the county of Cook and State of Illinois, have invented certain new and useful Improvements in Railway-Car Trucks, of which the following is a specification.

My invention relates to a railway car truck, and the principal object of the invention is to provide a four-wheel truck construction in which the body of the car is supported at opposite sides directly on the journal boxes by means of certain flexible suspension devices, one at each side of the car, which permit the car body to shift relatively to the running gear to the extent and in the directions necessary to allow the car to round curves.

The invention provides a truck construction which entirely eliminates the usual truck bolster and center plate and permits the body bolster and also the parts of the truck to be made considerably lighter than is ordinarily necessary. These desirable features result from the fact that the weight of the car is distributed directly to the journal boxes on opposite sides of the car instead of being carried to the center plate by the car bolster and then distributed to the wheels.

The invention consists in the new and improved arrangements, devices and constructions to be hereinafter described, for carrying out the above stated objects and such other incidental objects as will appear from the following desription of certain preferred embodiments of the invention.

In the drawings—

Fig. 1 shows, in plan, a truck constructed in accordance with the invention, the body bolster being illustrated fragmentarily.

Fig. 2 is a side elevation of the truck shown in Fig. 1.

Fig. 3 is a vertical section on line 3—3 of Fig. 2.

Fig. 4 is a view similar to Fig. 3 illustrating a modification.

Fig. 5 is a fragmentary side elevation, with certain parts in section, illustrating a somewhat different embodiment of the invention;

Fig. 6 is a sectional plan, with parts shown in elevation, on line 6—6 of Fig. 5;

Fig. 7 shows, in plan, a truck embodying the principles of my invention provided with a longer base than that shown in the foregoing views;

Fig. 8 is a side elevation of the truck shown in Fig. 7;

Like characters of reference designate like parts in the several figures of the drawings.

Figure 9:
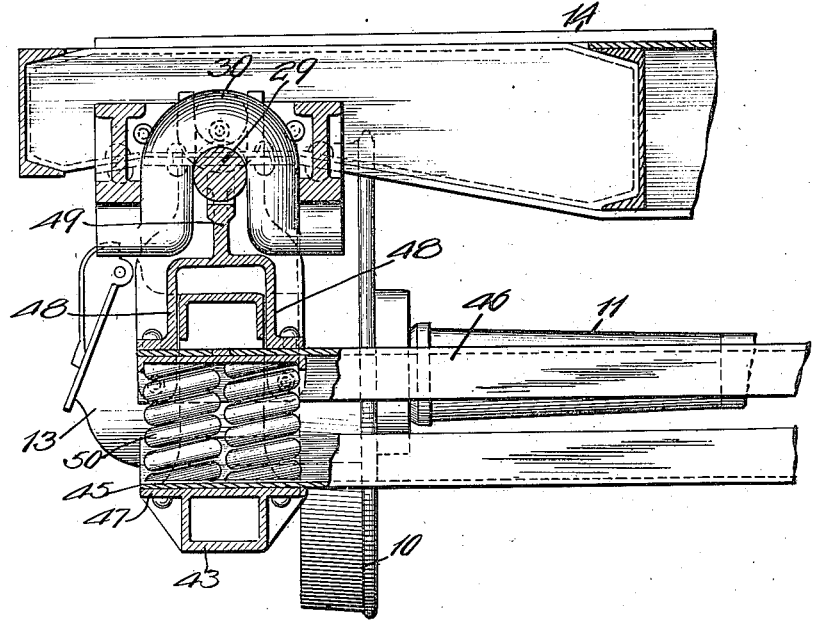
Fig. 9 is a vertical section taken on line 9—9 of Fig. 8.

In Figs. 1, 2 and 3 is shown a four-wheel truck, the wheels being designated by numerals 10 and their axles by numerals 11. The axles have the usual journals 12 provided with journal boxes 13. The body of the car is preferably supported on body bolsters of any desired construction, one of which is shown at 14. The bolster is supported at each end on the journal boxes at that side of the car by means of a flexible resilient suspension device. These suspension devices are the same on both sides of the car so that it will be sufficient to describe one of them.

Arranged between the journal boxes is a spring support 15 provided with a channeled spring pocket 16 in which are arranged coiled springs 17 resting on wear plates 18. The spring support is formed at each end with a longitudinal member 19 which rests upon the adjacent journal box and preferably projects beyond the wheel, in each case. These arms are formed with webs 20 through which pass bolts 21 engaging with a strip of metal 22 extending under the journal boxes and under the spring support and secured to the latter by bolts 23 which hold the wear plates 18 above referred to in position. The spring support is by this means secured firmly to the journal boxes. Preferably the spring supports on opposite sides of the truck are connected by transverse members 24 secured to the ends of arms 19.

Each spring support is formed at each end with a vertical guide channel 25 to receive a vertically sliding hanger support 26 adapted to be sustained by the springs 17. The hanger support is provided with a pair of upstanding spaced webs 27 extending transversely of the car and formed on the top with bearings 28 adapted to receive the ends of a hanger 29, the middle portion of which is preferably curved downwardly to provide a seat for an inverted U-shaped hanger 30. The latter is provided at its lower ends with gudgeons 31 which support a hanger bracket 32 which lies between and is secured to the channel members 33 of the body bolster 14. The hanger bracket 32 is formed with a pair of spaced depending webs 34, which webs extend longitudinally of the car, provided with bearings 35 for the gudgeons 31 of the U-shaped hanger 30. The spring supports on opposite sides of the car instead of being connected by the members 24, may be connected by a transverse member 36 arranged between the wheels, as shown in Fig. 4, the spring pocket 16 being cast, in such case, with projections or brackets 37 to which the member 36 may be riveted.

In Figs. 5 and 6 I have shown a modified form of spring support, designated 38, the other parts of the truck, with the exceptions noted, being the same as in the construction just described and being given in the drawings the same reference numerals as are used in Figs. 1 to 4 inclusive. Each end of the spring support 38 is in the form of a yoke 39 which extends over the adjacent journal box, the journal box being provided with flanges 40 to properly position the yoke. The journal box is preferably bolted to the yoke by a bolt 41 passing through a lug 42 formed on the top of the box.

Figure 10:
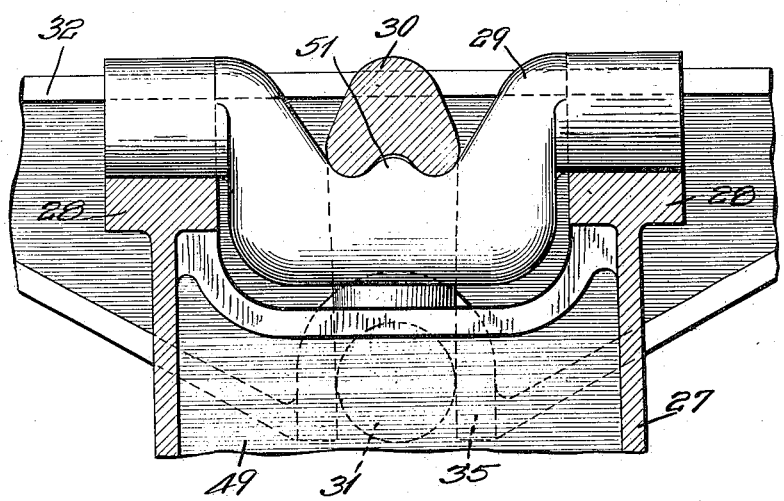
Fig. 10 is an enlarged detail view of the suspension devices shown in the three preceding figures.

In Figs. 7 to 10 inclusive, I have shown a modified form of spring support, designated 43, which is designed to give a longer wheel base than that shown in the preceding figures. The spring support 43 is arranged between and bolted to the journal boxes as shown (see Fig. 8), and is formed with a central opening 44 in the side which is adapted to receive the ends of the transverse channel bars 45 and 46. The channel bar 45 is bolted to flanges 47 on the spring supports 43. The channel bar 46 is inverted, that is to say, the side flanges project downwardly, the channel being bolted to the depending legs 48, 48, of the vertical sliding hanger support 49 which is supported on the springs 50. The suspension devices are similar to those shown in Figs. 1 to 6 inclusive, and have been given the same reference numerals with one exception which will be noted. The seat in the hanger 29, instead of having the contour, as shown in Figs. 1 to 6 inclusive, is formed with a rounded ridge 51 in the bottom, thus providing a double seat, one on each side of the ridge 51. With this form of seat in the hanger, when the car body moves forward or backward with respect to the wheels, its weight will be transmitted to the truck frame through one of the seats on either side of the ridge 51, and since these seats are off center, the tendency of the parts to assume their normal position as soon as the curve is passed is increased.

I do not claim broadly herein the suspension device consisting of the two coengaging hangers pivoted at right angles to each other, one to the car body and the other to the spring supporting member of the truck, as this arrangement is disclosed and claimed in the applications of Vinton E. Sisson, filed Apr. 24, 1919, Serial No. 292,322 (Patent No. 1,347,878 granted July 27, 1920) and my application Serial No. 264,349, filed November 27, 1918 (1,348,991 granted August 10, 1920) the invention here claimed relating to the application of this principle to suspension of the car body on the journal boxes to a truck having more than two wheels.

Operation: When the car rounds a curve some change in angular position as between the car body and axles is necessary, the amount depending upon the degree of curvature of the track, in order that the car should properly take the curve. In the truck construction above described, the car body has a floating relation with respect to the running gear allowing the movement of the former with respect to the latter both longitudinally of the car and also laterally. This permits the necessary change of angular position between the car body and wheel axles while eliminating the usual center plate and truck bolster construction. Any movement forward or back of the car makes hangers 30 rock on the hangers 29. A sidewise movement of the car body with respect to the running gear brings about a swinging movement of the hangers 29. The engagement between the hangers themselves and the connection of the hangers to the car body and truck respectively make possible a shifting movement of the car body with respect to running gear in any direction. The body of the car, therefore, has a floating movement with respect to the wheels which, within certain limits, is universal. These rocking movements of the hangers tend, however, to lift the car body from the wheels so that the movements are accomplished against the weight of the car which restores the parts to their normal position as soon as the curve is passed. This expedient for suspending the car body on the running gear tends to relieve the draft gears of the car of buffing and pulling strains. Any push or pull on the car body results in a slight forward movement of the body on the trucks accompanied by a slight raising of the car body. Some part of the shocks of buffing and pulling is thereby absorbed to the relief of the draft rigging of the car.

I claim:

1. In combination with the body of a railway car adapted to be supported at its ends on separate trucks, and a truck for supporting the car at one end comprising two axles with their wheels and journal boxes; means for independently sustaining each side of the car body on the journal boxes at that side of the car comprising a spring support carried by said journal boxes, springs on said support, and a suspension device supported upon said springs and connected with the car body so as to permit longitudinal movement of the body with respect to the running gear and rotational movement of the running gear with respect to the body.

2. In combination with the body of a railway car adapted to be supported at its ends on separate trucks, and a truck for supporting the car at one end comprising two axles with their wheels and journal boxes; means for independently sustaining each side of the car body on the journal boxes at that side of the car comprising a spring support carried by said journal boxes, springs on said support, and a suspension device supported upon said springs and connected with the car body so as to permit longitudinal and also lateral movements of the body with respect to the running gear.

3. In combination with the body of a railway car, and a truck comprising two axles with their wheels and journal boxes; means for independently sustaining each side of the car body on the journal boxes at that side of the car comprising a spring support carried by said journal boxes, springs on said support, a vertically movable member seated on the springs, and means for suspending the car body on said member with capacity for movements longitudinally and laterally with respect to the running gear of the car.

4. In combination with the body of a railway car, and a truck comprising two axles with their wheels and journal boxes; means for independently sustaining each side of the car body on the journal boxes at that side of the car comprising a spring support carried by said journal boxes, springs on said support, a vertically movable member seated on the springs, means for suspending the car body on said member with capacity for movements longitudinally and laterally with respect to the running gear of the car, and transverse members connecting the spring supports on opposite sides of the car.

5. In combination with the body of a railway car, and a truck comprising two axles with their wheels and journal boxes; a transverse body bolster on the under side of the car body, and means for independently sustaining each end of the body bolster on the journal boxes at that side of the car comprising a spring support carried by said journal boxes, springs on said support, and a suspension device interposed between the bolster and the springs which permits longitudinal and also lateral movements of the car body with respect to the running gear.

6. In combination with the body of a railway car, and a truck comprising two axles with their wheels and journal boxes; a transverse body bolster on the under side of the car body, and means for independently sustaining each end of the body bolster on the journal boxes at that side of the car comprising a spring support carried by said journal boxes, springs on said support, a vertically movable member seated on the springs, and means for suspending the car body on said member with capacity for movement longitudinally and laterally with respect to the running gear of the car.

7. In combination with the body of a railway car, and a truck comprising two axles with their wheels and journal boxes; a transverse body bolster on the under side of the car body, and means for independently sustaining each end of the body bolster on the journal boxes at that side of the car comprising a spring support carried by and secured to said journal boxes, springs on said support, a vertically movable member seated on the springs and guided by said spring support, and a pair of coengaging hangers pivoted at right angles to each other, one to the car body and the other to said vertically movable member.

8. In combination with the body of a railway car, and a truck comprising two axles with their wheels and journal boxes; a transverse body bolster on the under side of the car body, means for independently sustaining each end of the body bolster on the journal boxes at that side of the car comprising a spring support carried by and secured to said journal boxes, springs on said support, a vertically movable member seated on the springs and guided by said spring support, and a pair of coengaging hangers pivoted at right angles to each other, one to the car body and the other to said vertically movable member, and transverse members connecting the spring supports on opposite sides of the car.

9. In combination with the body of a railway car, and a truck comprising two axles with their wheels and journal boxes; a transverse body bolster on the under side of the car body, and means for independently sustaining each end of the body bolster on the journal boxes at that side of the car comprising a spring support arranged between and extending over and secured to the journal boxes, springs on said support, a vertically movable member seated on the springs and guided by said spring support, and a pair of coengaging hangers pivoted at right angles to each other, one to the car body and the other to said vertically movable member.

10. In combination with the body of a railway car, and a truck comprising two axles with their wheels and journal boxes; means for independently sustaining each side of the car body on the journal boxes at that side of the car comprising a spring support carried by said journal boxes, springs on said support, a vertically movable member seated on the springs, formed with upstanding webs having bearings at their upper ends, a hanger pivotally mounted in said bearings, a hanger bracket on the car provided with a pair of depending webs standing at right angles to the beforementioned webs and formed with bearings, and a hanger pivotally mounted in the bearings on the depending webs and supported with a rocking engagement on said first named hanger.

11. In combination with the body of a railway car adapted to be supported at opposite ends on separate trucks, a truck for supporting one end of said car body comprising a frame, two pairs of wheels journaled in said frame, and suspension means resiliently supported on said frame and connected with the car body so as to allow the same both lateral and longitudinal movement with respect to the truck.

12. In combination with the body of a railway car adapted to be supported at opposite ends on separate trucks, a truck for supporting one end of said car body comprising a frame, two pairs of wheels journaled in said frame, and suspension means at each side of the truck resiliently supported on said frame and connected with the car body so as to allow the same both lateral and longitudinal movement with respect to the truck.

13. In combination with the body of a railway car adapted to be supported at opposite ends on separate trucks, a truck for supporting one end of said car body, two pairs of wheels journaled in said truck, and a pair of link hanger mechanisms for supporting the opposite sides of the car upon corresponding sides of the truck, respectively, with capacity for universal movement.

14. In combination with the body of a railway car adapted to be supported at opposite ends on separate trucks, a truck for supporting one end of said car body, two pairs of wheels journaled in said truck, and a pair of link hanger mechanisms for flexibly supporting the opposite sides of the car upon corresponding sides of the truck, respectively, which permit both longitudinal and lateral movements of the car body with respect to its running gear.

15. In combination with the body of a railway car adapted to be supported at opposite ends on separate trucks, a truck for supporting one end of said car body, two pairs of wheels journaled in said truck, and a pair of link hanger mechanisms for flexibly supporting the opposite sides of the car upon corresponding sides of the truck, respectively, so constructed that displacement of the car body from normal position involves a rising of the car body with respect to the wheels.

16. In combination with the body of a railway car adapted to be supported at opposite ends on separate trucks, a truck for supporting one end of said car body, two pairs of wheels journaled in said truck, and a pair of link hanger mechanisms for flexibly supporting the opposite sides of the car upon corresponding sides of the truck, respectively, which permit angular shifting of the car body with respect to its running gear in rounding curves, said hanger mechanisms being constructed so that displacement of the car body from normal position involves a rising of the car body with respect to the wheels.

17. In combination with the body of a railway car, a truck comprising a frame, two pairs of wheels journaled in said frame, springs on opposite sides of said frame, vertically movable members supported on said springs, and a pair of link hanger mechanisms flexibly supporting opposite sides of the car upon the corresponding vertically movable members with capacity for universal movement.

18. In combination with the body of a railway car, running gear for the same comprising a four wheeled truck, and means for flexibly connecting opposite sides of the car body with said truck whereby the car body may assume an angular position with respect to the truck but is raised therefrom in so doing.

GARTH G. GILPIN.